United States Patent
Thompson et al.

(10) Patent No.: US 12,029,350 B2
(45) Date of Patent: *Jul. 9, 2024

(54) CONNECTION MECHANISM FOR GRILLING UTENSIL WITH A REMOVABLE TIP

(71) Applicant: Thompson Brothers & Company LLC, Oakdale, MN (US)

(72) Inventors: Joshua Thompson, Saint Paul, MN (US); Nathan Thompson, North Saint Paul, MN (US); Jason Thompson, Woodbury, MN (US); Andrew N. Stadick, Oakdale, MN (US)

(73) Assignee: Thompson Brothers & Company LLC, Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,707

(22) Filed: Aug. 1, 2022

(65) Prior Publication Data

US 2022/0386814 A1 Dec. 8, 2022

Related U.S. Application Data

(63) Continuation of application No. 16/161,513, filed on Oct. 16, 2018, now Pat. No. 11,399,660.
(Continued)

(51) Int. Cl.
*A47J 37/07* (2006.01)
*A47J 43/28* (2006.01)
(Continued)

(52) U.S. Cl.
CPC ......... *A47J 37/0786* (2013.01); *A47J 43/288* (2013.01); *A47L 13/02* (2013.01);
(Continued)

(58) Field of Classification Search
CPC ..... A47J 37/0786; A47J 43/288; A47L 13/02; A47L 13/022; A47L 13/08
(Continued)

(56) References Cited

U.S. PATENT DOCUMENTS

| 135,699 | A | 2/1873 | Davis |
| 1,610,352 | A | 12/1926 | Bergman |

(Continued)

FOREIGN PATENT DOCUMENTS

| CA | 2 386 483 Y | 11/2003 |
| CN | 303725014 | 6/2016 |

(Continued)

OTHER PUBLICATIONS

European Search Report, European Application No. 21172523.9, mailing date Jul. 21, 2021, 6 pages.
(Continued)

*Primary Examiner* — Laura C Guidotti
(74) *Attorney, Agent, or Firm* — Merchant & Gould P.C.

(57) ABSTRACT

A grilling tool is described herein that has a replaceable tip, and can be used with a variety of other attachments. The grilling tool can be made of a heat-conformable material such that during use grooves are formed in the replaceable tip that correspond to a grilling surface on which it is used. Once the grooves are too deep or the tip is fully used, the tip can be replaced.

5 Claims, 8 Drawing Sheets

Related U.S. Application Data

(60) Provisional application No. 62/572,668, filed on Oct. 16, 2017.

(51) Int. Cl.
| | |
|---|---|
| *A47L 13/02* | (2006.01) |
| *A47L 13/08* | (2006.01) |
| *A47L 13/34* | (2006.01) |
| *A47L 13/42* | (2006.01) |
| *A47L 17/06* | (2006.01) |
| *A47L 13/12* | (2006.01) |

(52) U.S. Cl.
CPC .............. *A47L 13/08* (2013.01); *A47L 13/34* (2013.01); *A47L 13/42* (2013.01); *A47L 17/06* (2013.01); *A47L 13/12* (2013.01)

(58) Field of Classification Search
USPC ......................................................... 15/145
See application file for complete search history.

(56) References Cited

U.S. PATENT DOCUMENTS

| | | |
|---|---|---|
| 1,647,751 A | 11/1927 | Schacht |
| 1,898,747 A | 2/1933 | Schacht |
| 2,417,356 A | 3/1947 | Field |
| 2,662,353 A | 12/1953 | Bergman et al. |
| D181,495 S | 11/1957 | Sinko |
| 3,092,411 A | 6/1963 | Hardy |
| D247,018 S | 1/1978 | Kramer et al. |
| D256,473 S | 8/1980 | Wagner |
| D268,215 S | 3/1983 | McBride |
| 4,969,268 A | 11/1990 | Kelly, III |
| 5,749,117 A | 5/1998 | Forsline |
| 5,924,460 A | 7/1999 | Jones |
| 6,276,023 B1 | 8/2001 | Grundy |
| D487,556 S | 3/2004 | Siegel et al. |
| 6,735,840 B2 | 5/2004 | Gibbs |
| D496,231 S | 9/2004 | Germany |
| 7,162,802 B2 | 1/2007 | Benardeau et al. |
| D606,372 S | 12/2009 | Gorskey et al. |
| D616,713 S | 6/2010 | Jossem |
| D617,967 S | 6/2010 | Lambert |
| D620,768 S | 8/2010 | Jossem |
| D627,200 S | 11/2010 | Rothman |
| 7,956,711 B2 | 6/2011 | Fullerton et al. |
| D687,202 S | 7/2013 | Motsenbocker |
| 8,746,765 B1 | 6/2014 | Mafi |
| 9,790,692 B2 | 10/2017 | Bemicke-Grussing et al. |
| 9,820,612 B2 | 11/2017 | Thompson et al. |
| D808,234 S | 1/2018 | Lane |
| D835,370 S | 12/2018 | Thompson et al. |
| 11,399,660 B2 * | 8/2022 | Thompson .............. A47L 13/02 |
| 2011/0088265 A1 | 4/2011 | Madren |
| 2011/0225755 A1* | 9/2011 | Carlson .................... A46B 7/04 |
| | | 15/159.1 |
| 2011/0258801 A1 | 10/2011 | Thompson et al. |

FOREIGN PATENT DOCUMENTS

| | | | |
|---|---|---|---|
| EP | 1163875 A1 | 12/2001 | |
| GB | 202236 A * | 3/1923 | ............. A47L 17/06 |

OTHER PUBLICATIONS

Allway Tools DS20P Plastic Putty Knife, Life and Home Website 2018, https://www.lifeandhome.com/products/allway-tools-ds20p-plastic-putty-knife-paint-sera . . . , site visited Dec. 25, 2018.

Household Kitchen Flat Wooden Cooking Spatula Rice Paddle, Overstock website 2018, https://www.overstock.com/Home-Garden/Household-Kitchen-Flat-Wooden-Cooking-sp . . . , site visited Dec. 25, 2018.

Products, Great Scrape, website 2018, https://www.thegreatscrape.com/products, site visited Dec. 25, 2018.

Wooden Grill Scraper—Shop, Pampered Chef, reviews 2017, site visited Jul. 2, 2018, https://www.pamperedchef.com/shop/Outdoor/BBQ+Tools/Wooden+Grill+Scraper/2723#reviewsRatings.

EP Search Report for EP Application No. 18196633.4 dated Dec. 21, 2018, 6 pages.

* cited by examiner

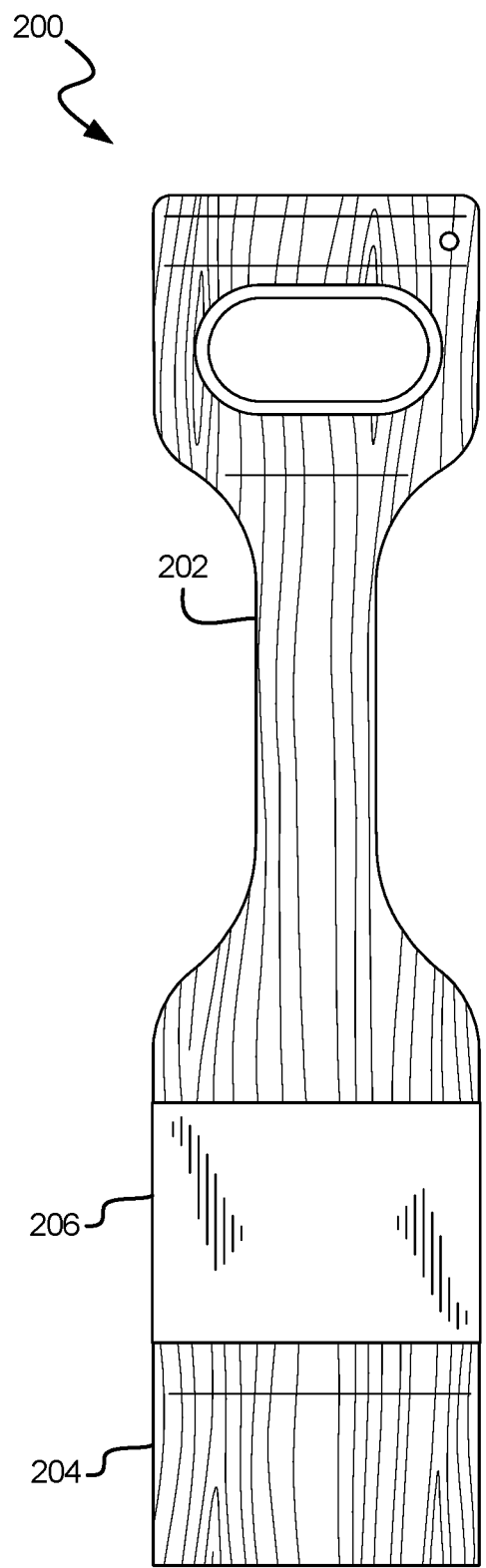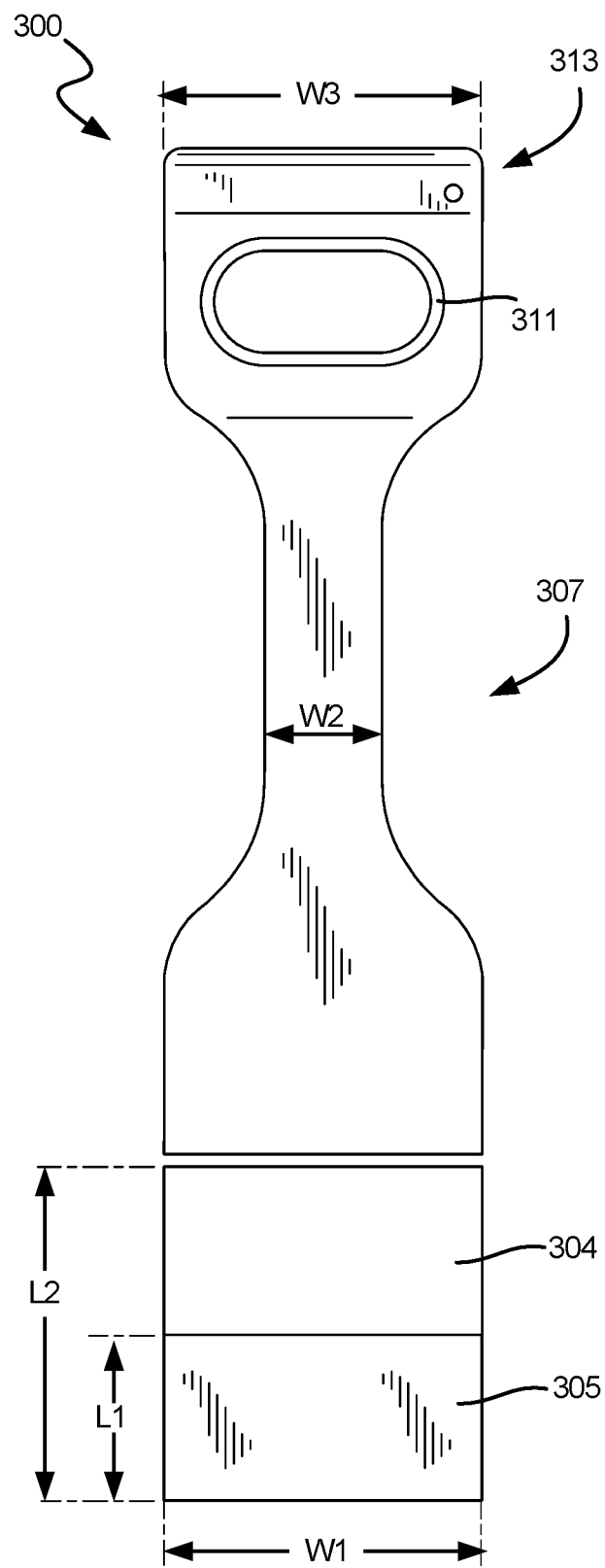
FIG. 2  FIG. 3

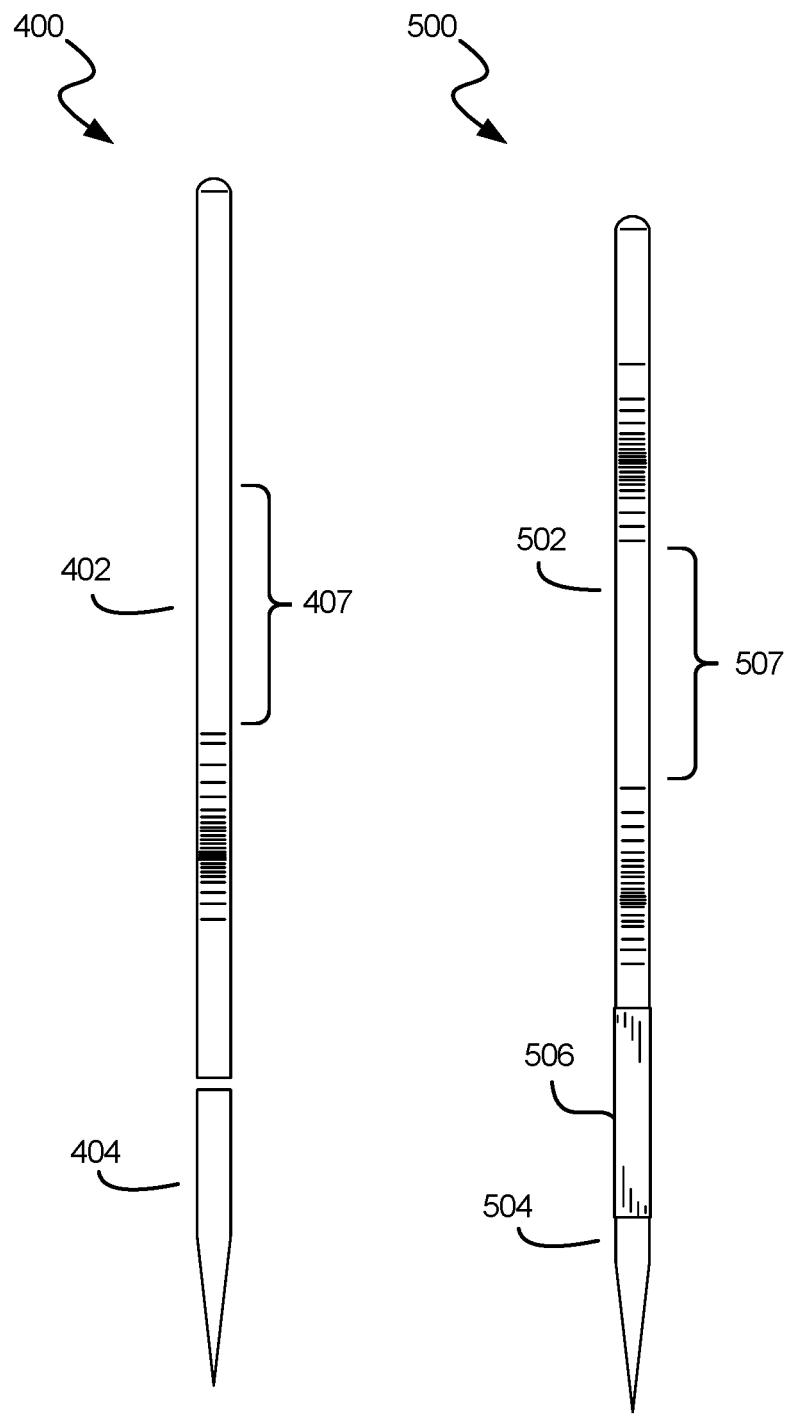

CONNECTION MECHANISM FOR GRILLING UTENSIL WITH A REMOVABLE TIP

RELATED APPLICATION

The present application claims the benefit of U.S. Provisional Application No. 62/572,668 filed Oct. 16, 2017, which is hereby incorporated herein in its entirety by reference.

TECHNICAL FIELD

The present application is generally related to tools for maintaining a barbeque grill. More specifically, embodiments of the present application are directed to a cleaning tool for cleaning and removing debris from a cooking grate in a barbeque grill using a cleaning tool with a conformable scraping edge that adapts to the physical layout of the cooking grate, wherein the conformable scraping edge is replaceably attached to a permanent body by a magnetic coupling device.

BACKGROUND

One of the most common forms of cooking, entertainment, and socializing is to cook out-doors on a barbeque (BBQ) grill. Grills can take a variety of forms, including those fueled by charcoal, propane, or natural gas. Many individuals have their own personal grills located on backyard decks or patios while many public parks will have permanent grills available to be used by park visitors.

Regardless of grill design or location, one common result is the formation of charred debris on a grate surface of the grill. This charred debris is formed from the foods being cooked on the grate surface including meat, fish, vegetables, and the like. The presence of this charred debris on the grate surface can create an unsatisfactory eating experience by having a detrimental impact on the taste and appearance of food being cooked. Users are generally encouraged to remove the charred debris and a variety of cleaning tools are commercially available, including a wide variety of brush and scraper tools.

Unfortunately, commercially-available cleaning tools suffer from a number of issues. Brushes often become clogged with debris such that a user is cleaning a dirty grilling grate with a dirty brush. Scrapers generally have a hard scraping surface that can clean an upper surface of the grill grate but do not conform well with rounded surfaces that are frequently present on the upper profile of grill grates such that the charred debris often remains present on the sides and bottoms of the grill grate. Wire bristle brushes that are commonly used to clean grill surfaces can leave remnants or bristles on the grill surface, which can become embedded in food and pose a health risk. As there are a variety of issues with commercially available grill cleaning tools, it would be advantageous to have a new grill cleaning tool that is well equipped to deal with charred debris of the type found on almost every barbeque grill grate safely.

SUMMARY OF THE INVENTION

Embodiments are directed to a grilling utensil for cleaning a heated grill surface that includes a permanent body and a replaceable tip. The replaceable tip may include, for example, a conformable scraping edge that is manipulated across the heated grill surface to remove char and other debris from the grill surface. The conformable scraping edge may be formed of a heat-responsive material, such as a suitable wood species, generally selected due to its non-toxic qualities. The wood species may also be selected based upon expected grilling temperatures or a desired "seasoning" to be applied to the grill surface. As the conformable scraping edge slides back and forth across the heated grill surface, a combination of pressure applied by a user as well as the heat of the grill surface results in the formation of individual grooves along the conformable scraping edge. The grooves are formed to match an upper profile of the grill surface. Over time, the grooves fully conform to the upper profile of the grill surface such that an entire cooking surface can be scraped clean of char and debris. In alternative embodiments, different attachments can be affixed to the permanent body, having any of a variety of other structures or functions.

In one aspect, the present invention is directed to a grilling utensil that includes a magnetic element arranged in the permanent body and configured to magnetically couple the replaceable tip to the permanent body with sufficient force to facilitate manipulation of the scraping edge across the heated grill surface. Both the permanent body and the replaceable tip may be formed of a heat-responsive material, such as wood.

The replaceable tip includes a distal end opposite a proximate end, the distal end defining the conformable scraping edge. At the distal end, an upper beveled surface and a lower beveled surface may converge to define a conformable scraping edge that is initially straight. Over time, grooves matching the upper profile of the grill surface may form along the conformable scraping edge in response to pressure applied by the user and heat from the grill surface. At the proximate end, a number of pilot holes may be arranged to facilitate the attachment of a second replaceable tip to the permanent body. Additionally, a magnetically susceptible element may be affixed to the proximate end to facilitate the magnetic coupling between the replaceable tip and the permanent body.

The grilling utensil may further include a ferrule that circumscribes at least a portion of the permanent body and the replaceable tip to strengthen the grilling utensil and prevent it from splitting or wearing. For example, the ferrule may comprise an upper portion that is attached to the permanent body and a lower portion that extends past the permanent body to define an insertion sleeve for the replaceable tip. The insertion sleeve may assist in accurately aligning the replaceable tip with the permanent body, as well as providing added strength to the magnetic coupling element. The ferrule may be made from any appropriate material, such as metal or plastic.

In another aspect, the present invention is directed to scraping a heated grill surface with a grilling utensil that includes a scraping edge formed of a heat-responsive material, and replacing a first replaceable tip with a second replaceable tip. Generally, a grilling utensil is provided that includes a permanent body portion magnetically coupled to a replaceable tip that includes a conformable scraping edge made of the heat-responsive material.

A user scrapes the heated grill surface with the conformable scraping edge, such that the conformable scraping edge is in direct contact with the heated grill surface. The method further includes forming individual grooves in the conformable scraping edge that match an upper profile or cooking surface of the grill surface. In response to pressure applied by the user and heat from the grill surface, the grooves will eventually fully conform to the grill surface such that the entire cooking surface can be scraped clean of char and debris.

The method further includes replacing the replaceable tip with a second replaceable tip by disconnecting the magnetic coupling between the permanent body and a first replaceable tip. The second replaceable tip may then be magnetically coupled to the permanent body by a magnetically susceptible element and a number of pilot holes arranged on a proximate end of the replaceable tip, opposite the distal end that is defined by the conformable scraping edge. Additionally, the grilling utensil may include a ferrule attached to the permanent body and extending past the permanent body to define an insertion sleeve that facilitates the attachment of the second replaceable tip to the permanent body. When the replaceable tip is magnetically coupled to the permanent body, the ferrule may circumscribe at least a portion of the proximate end, providing additional strength to the magnetic coupling.

A further aspect of the present invention is directed to a method of making a replaceable tip for a grilling utensil that includes a scraping edge formed of a heat-responsive material. A replaceable tip may be formed to include a conformable scraping edge at a distal end that is opposite a magnetically susceptible element at a proximate end. The distal end may include beveled surfaces formed of a heat-responsive material that meet at the conformable scraping edge. The proximate end may further include a plurality of holes arranged to facilitate attachment to a permanent body of the grilling utensil.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 2 is a top plan view of a grilling utensil according to a representative embodiment.

FIG. 3 is a top plan exploded top view of a grilling utensil according to an embodiment.

FIG. 4 is an exploded partial side view of a grilling utensil according to an embodiment.

FIG. 5 is a side view of a grilling utensil according to an embodiment.

Figure 1:
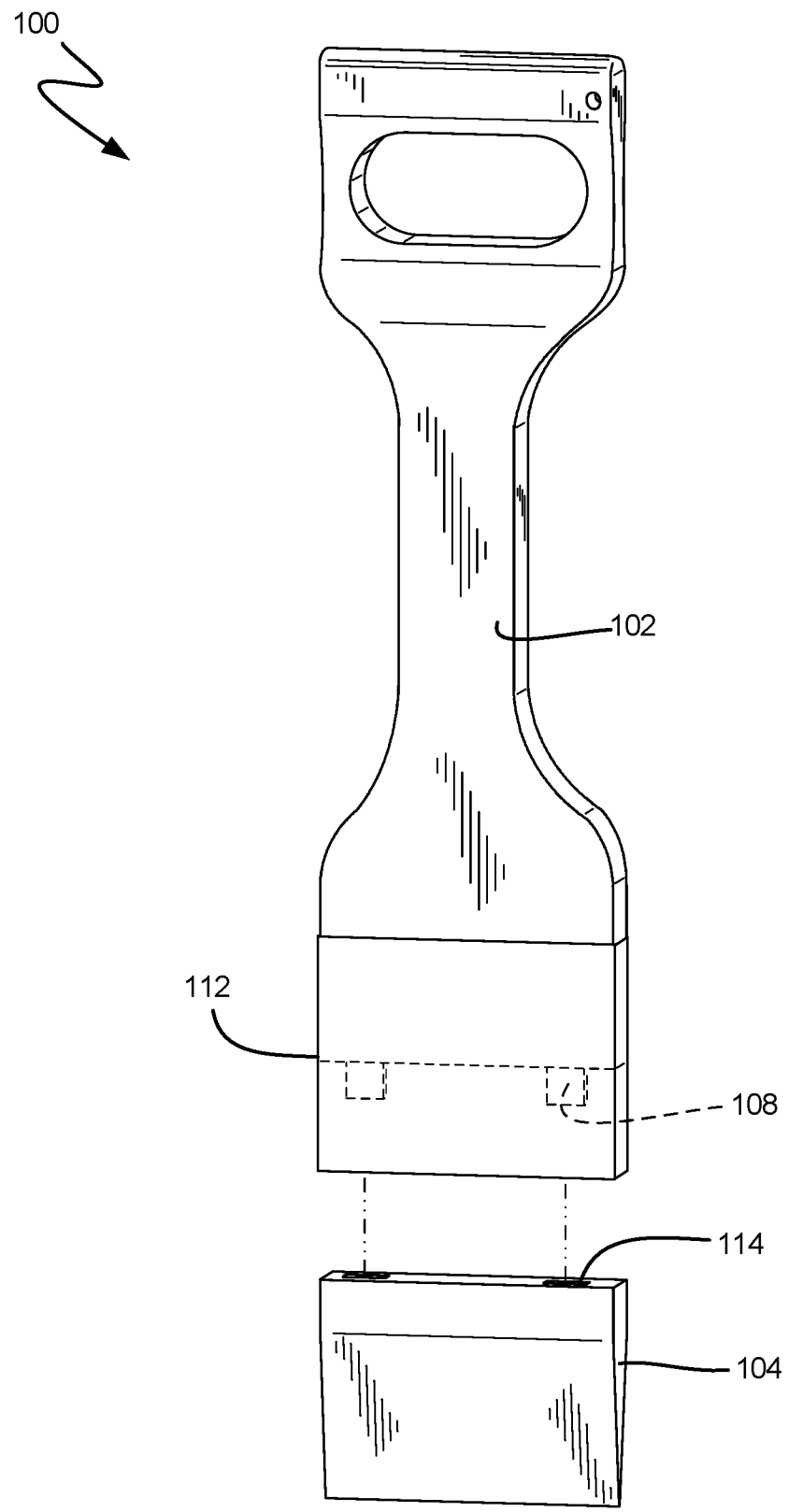
FIG. 1 is a top exploded view of a grilling utensil according to a representative embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

According to embodiments described herein, a grill scraper is provided that addresses these problems with conventional grill cleaners and scrapers. Specifically, embodiments described herein do not include bristles that can dislodge from the scraper and end up on a cooking surface or in food cooked on the cooking surface. Rather, embodiments described herein can include a tip that is deformed or ablated by contact with the hot cooking surface, such that grooves matching the spacing of the grating on a grilling surface, for example.

After sufficient use, conformable materials such as wood will form grooves corresponding to a grilling surface. If a scraper made of a conformable material is used past that point, the grooves can deepen until they are awkward to use. At some point, the scraper will be completely ablated, or the tip will have such deep grooves that the user will dispose of the scraper and use a new one.

In some cases, a grill scraper can be used frequently, such as daily or even multiple times per day. Some grill scrapers can be used for commercial applications, or in communal spaces, or for large groups of people such that conformable grill scrapers will wear out and require replacement frequently. Each time that the grill scraper is worn out, the users must buy an entirely new scraper. Furthermore, a large quantity of material in the scraper is wasted, such as the handle or scraper body, that is still in good condition but must be disposed of because the tip is too worn down to be practicable.

Embodiments described herein reduce wasted expense, and reduce wasted material, by separating the components of the grill scraper such that the tip can be replaced without disposing of the handle. Additionally, the attachment mechanism between the scraper handle and the tip can be used to attach other types of tips or tools to the scraper handle. To facilitate rapid transition between scraper tips and other attachments, a magnetic coupling can be used to affix the handle to each type of tip. Studs, pegs, dowels, or other fixed mechanical mating mechanisms can also be disposed on the handle to engage with the tip and prevent decoupling of the tip or movement of the tip relative to the handle in undesired directions.

FIG. 1 is a top view of a grilling utensil 100, according to an embodiment. Grilling utensil 100 includes two interconnected portions: a permanent body 102 and a replaceable insert 104. In use, the interconnected permanent body 102 and replaceable insert 104 can be disconnected, reconnected, or connected to additional or replacement components, as described in more detail below.

Permanent body 102 includes engagement portion 112 and magnetic elements 108. Permanent body is referred to as "permanent" because it can be used with a series of replaceable or interchangeable components. In embodiments, permanent body 102 can be used with a series of components that are identical or very similar to one another, which can become worn and need replacing over time. In embodiments, permanent body 102 can be used with a series of components that are not the same as one another, such as components that can be used for a variety of different functions, or on grills having different temperatures, grill bar scraping, thicknesses, or flavors. In embodiments, permanent body 102 can be used with combinations of these. For example, permanent body 102 can be used with a series of wooden grill scrapers that are identical or similar to one another, and are replaced as each of the tips becomes worn down through use as a grill scraping tip. The same permanent body 102 can be used one or more other fixtures or attachments that are attached to permanent body 102 through the same attachment mechanism, examples of which are provided in more detail below.

Permanent body 102 can be made of a material that is sturdy, hardy, or weatherable, in embodiments. For example. permanent body can be made of a polymer, a ceramic, or a metal. In other embodiments, permanent body 102 can be made primarily of the same material as an expected replaceable insert 104. For example, where replaceable insert 104 is a wooden grill scraper, permanent body 102 can be made of wood also. In embodiments, the material used in permanent body 102 can be selected for its heat transfer characteristics. Certain plastics, ceramics, glasses, or organic materials can transfer heat less rapidly than metals, for example. In order to provide a user with the ability to hold at manipulation end 104, it can be beneficial to have low heat transfer characteristics.

Permanent body 102 includes magnetic elements 108. In the embodiment shown in FIG. 1, there are two permanent magnet elements 108. In alternative embodiments, there could be a higher or lower number of permanent magnet elements 108 employed. Permanent magnet elements 108 provide a mounting point for a corresponding magnetic element in removable tip 104 or other fixtures that can be attached to permanent body 102.

As shown in FIG. 1, each of the permanent magnet elements 108 is elongated. Each of permanent magnet elements 108 can be received in a corresponding pilot hole or similar mechanical mating structure. Elongation of permanent magnet elements 108 provides mechanical support and prevents rotation of the replaceable tip 104 or other attachments. As described in more detail with respect to other embodiments below, magnets can be provided that do not also mechanically engage with a replaceable tip 104 or other attachments. Rather, magnets can be coupled with other features such as dowels, mortises, pegs, or other mechanical coupling features that prevent movement in any desired direction.

Replaceable tip 104 includes pilot holes 114 that are configured to receive magnetic elements 108. Replaceable tip 104 can include a beveled and/or straight edge surface for use as a grill scraper, in the embodiment shown in FIG. 1.

Figure 13A:
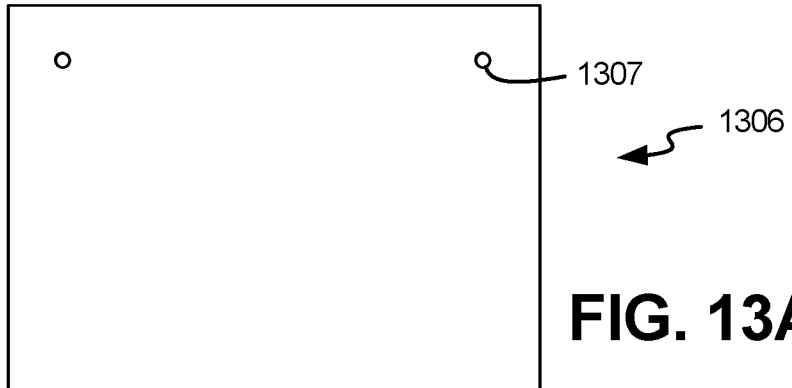
FIGS. 13A and 13B are bottom views of ferrules according to two embodiments.
Figure 13B:
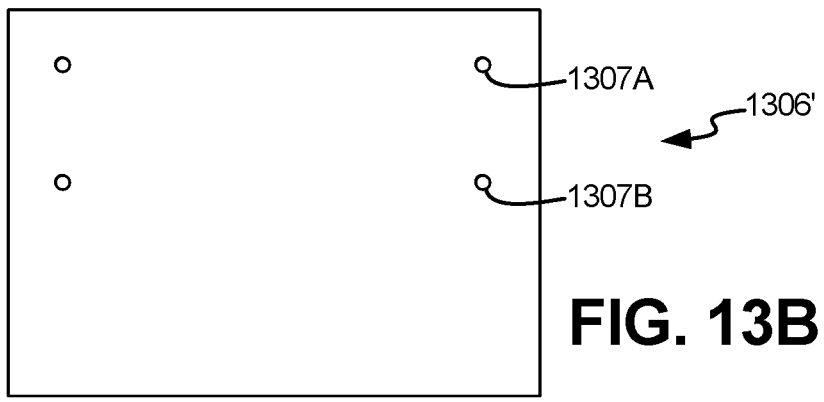
Figure 14:
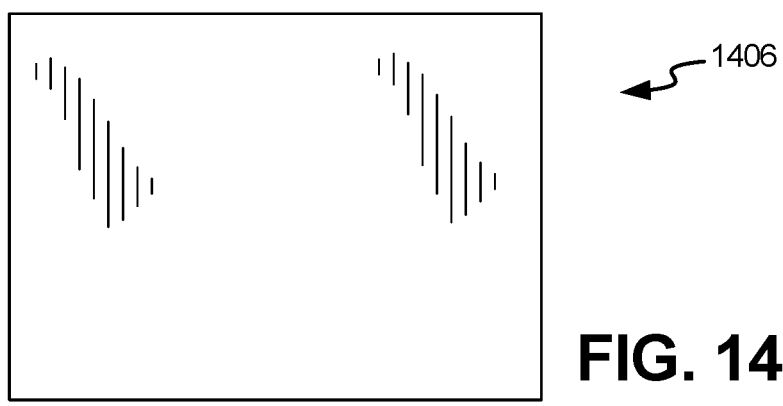
FIG. 14 is a top view of a ferrule according to an embodiment.
Figure 15:
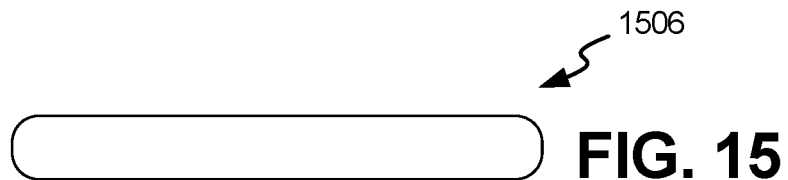
FIG. 15 is a front view of a ferrule according to an embodiment.

In alternative embodiments, such as those shown in FIGS. 13-15, other attachments can engage with magnetic elements 108.

Magnetic elements 108 are shown in phantom in FIG. 1 because they are embedded within permanent handle 102. Permanent handle 102 can extend as a sleeve around a proximal end of replaceable tip 104. In alternative embodiments, such as the one depicted in FIG. 2, a ferrule can circumscribe both permanent handle 102 and replaceable tip 104. Either due to the sleeve shape of permanent handle 102, or due to the constriction caused by the ferrule, replaceable tip 104 can be constrained to prevent undesirable movement or disconnection during use.

As a conformable scraping edge of replaceable tip 104 is pushed back and forth across a grill surface, a combination of pressure applied by a user and heat from the grill surface results in the formation of individual grooves along conformable scraping edge. The grooves are formed to match an upper profile of the grill surface. Over time, the grooves fully conform to the upper profile of the grill surface such that an entire cooking surface can be scraped clean of char and debris. The features described above facilitate replacement of a worn tip 104 with a new version or with a different type of tip for the same function or for a different function.

Depending upon the type of food being prepared, certain advantages may exist for using a specific species of wood as a heat-responsive material that makes up at least the replaceable tip 104. For example, hardwoods may be preferred for use of grilling utensil 100 with foods prepared at high heat, while softwoods may be preferred for use of grilling utensil 100 with foods prepared at low heat. Additionally, a heat-responsive material can be selected due to a seasoning flavor applied to food or the grill surface by heat-responsive material as grilling utensil 100 is used.

Further, the proximate end of the replaceable tip 104 can be made of a different heat-responsive material than the distal end of the same replaceable tip, or from permanent body 102. For instance, the proximate end can be made of a hardwood or other sturdy material chosen to reduce wear and damage to the proximate end over time, while the distal end can be a heat-responsive material chosen based on a desired grilling temperature or seasoning.

FIG. 2 is a plan view of another grill scraper 200, according to another embodiment. The embodiment shown in FIG. 2 differs from the grill scraper 100 shown in FIG. 1 in that removable tip 204 is held in place with ferrule 206, rather than a portion of permanent body 202 that is shaped as a sleeve.

Ferrule 206 can be permanently fixed to permanent body 202 to at least partially surround replacement tip 204 when replacement tip 204 is fixed to permanent body 202. Alternatively, ferrule 206 can be separate from both components, or can be a part of replacement tip 204. In embodiments where ferrule 206 is attached to replacement tip 204, ferrule 206 can include some indication of, for example, the material that makes up replacement tip 204. In embodiments, ferrule 206 can be attached to permanent body 202 or replacement tip 204 with screws, with adhesive, by interference fit, or by any other suitable coupling. If an adhesive is used, the adhesive can be selected such that exposure to heat will not cause outgassing, burning, melting, or loss of adhesion.

Ferrule 206 can strengthen the engagement of permanent body 202 with replaceable tip 204, preventing damage to the engagement portions described with respect to FIG. 1.

In an alternative embodiment, permanent body 202 can be completely covered by ferrule 206. In one embodiment, permanent body 202 is covered in a material such as plastic or metal, such as by dip-coating.

FIG. 3 is an exploded top view of a grilling utensil 300 illustrating one possible set of measurements. As shown in FIG. 3, replaceable tip 304 has a width W1 of 4.75 inches. Replaceable tip 304 includes a beveled portion 305 that has a length L1 of 2.5 inches, which is half of the 5-inch overall length L2 of replaceable tip 304. Permanent body 302 has a necked portion 307 with a width W2 of 1.75 inches, and a handle portion 309 with a width W3 of 4.75 inches.

FIG. 3 shows grip aperture 311 that facilitates use of grilling utensil 300 by providing a grip point. Grip aperture 311 can have dimensions that are suited for grasping with one hand while the other is used on the necked portion 307. The manipulation end 313, necked portion 307, and grip aperture 311 can each be rounded with shapes and sizes appropriate for an operator's hands.

FIGS. 4 and 5 are side views of grilling tools 400 and 500, respectively. FIG. 4 shows permanent body 402 and replaceable tip 404, as well as a long necked portion 407. FIG. 5 shows permanent body 502 and replaceable tip 504 that are coupled at ferrule 506. FIG. 5 has a narrow, rounded necked portion 507 that is shorter than the long central necked portion 407 of FIG. 4.

Figure 6:
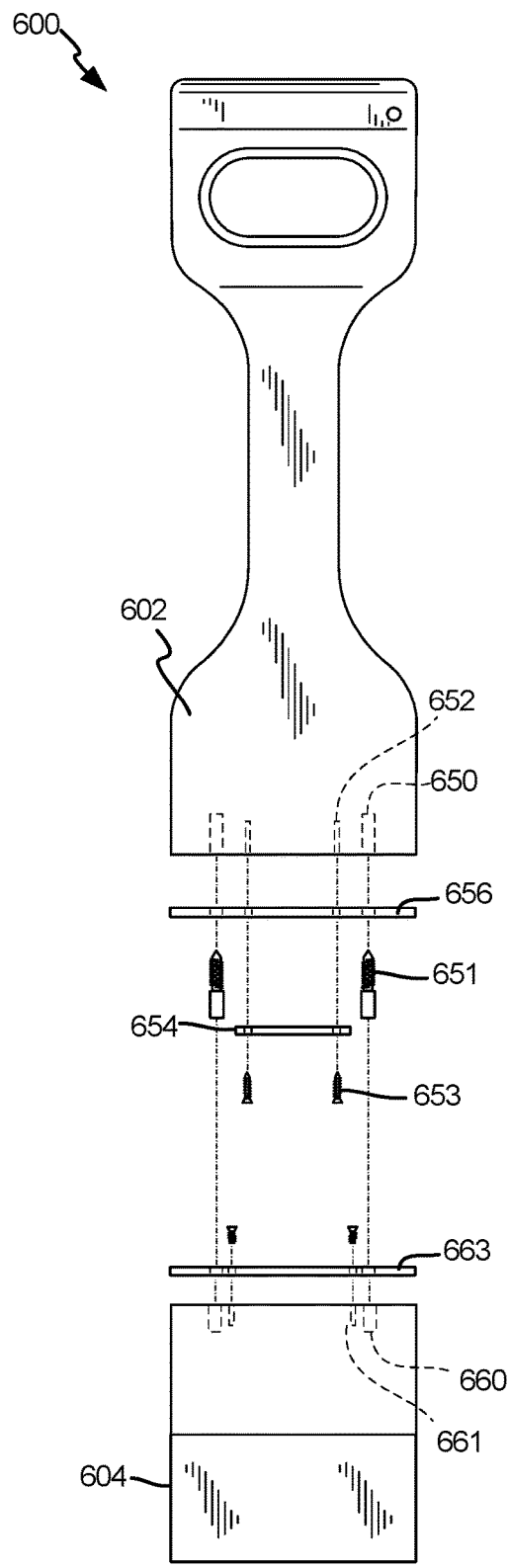
FIG. 6 is an exploded top view of the grilling utensil of FIG. 1, with obscured aspects of the grilling utensil shown in phantom.

FIG. 6 is an exploded top view of a grilling utensil 600. Grilling utensil 600 includes permanent body 602 and replaceable tip 604, which are substantially similar to the components having similar elements (iterated by factors of 100) described with respect to the other Figures.

To form the connection between permanent body 602 and replaceable tip 604, various elements are shown that create a mechanical and magnetic coupling. Permanent body 602 defines drilled holes 650 that are configured to receive threaded studs 651 or some other protrusion. Likewise, drilled holes 652 are configured to receive countersunk screws 653. Threaded studs 651 and countersunk screws 653 hold permanent magnet 654 and steel plate 656 against permanent body 602. An unthreaded portion of threaded screws 651 extends from permanent body 602 when the screws are affixed thereto, which can act as dowels to mechanically couple permanent body 602 to replaceable tip 604 and prevent rotation between those two components.

Replaceable tip 604 includes drilled holes 660 and 661. Drilled holes 660 are configured to receive the unthreaded portion of threaded studs 651. Drilled holes 661 are configured to receive countersunk screws 662 that hold steel plate 663 against the rest of replaceable tip 604. In embodiments, steel plate 663 can be packaged separately from the rest of replaceable tip 604, such that it does not need to be replaced with each replacement of the tip, or it can be usable with multiple types of tips.

Steel plate 663 and magnet 654 form a magnetic connection between permanent body 602 and replaceable tip 604. The magnetic coupling prevents replaceable tip 604 from moving away from permanent body 602. Threaded studs 651 meanwhile prevent rotation of replaceable tip 604 with respect to permanent body 602, and provide mechanical support such that a user can push replaceable tip 604 against a grill surface, even at an angle, without decoupling replaceable tip 604 from permanent body 602.

In alternative embodiments, various other arrangements of studs and magnets can be used that will achieve these same goals. Likewise, other materials can be used. As described above, a magnetic element and a magnetically susceptible elements (steel) are used in this embodiment, but in other embodiments two magnets could be used, or a series of magnets in one or both ends, each paired with a corresponding magnet or magnetically susceptible component, can be used. In embodiments, the magnetic element can be a rare earth magnet.

Figure 7:
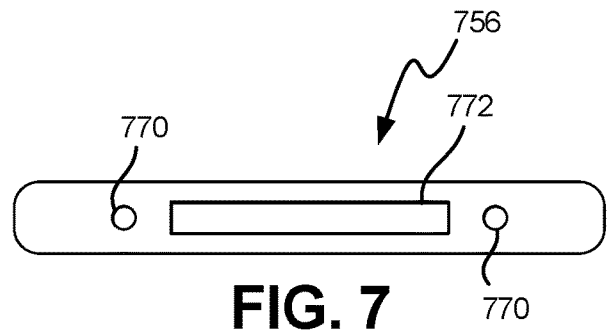
FIG. 7 is a top view of a plate according to an embodiment.

FIG. 7 is a cross-sectional view of a steel plate 756 that can be affixed to a permanent body (e.g., steel plate 656 that can be affixed to permanent body 602 as shown in FIG. 6) according to an embodiment, defining holes 770 for threaded studs and a central aperture 772 for a magnet to pass through.

Figure 8:
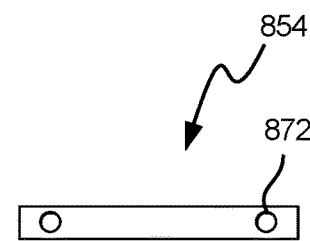
FIG. 8 is a top view of a magnet according to an embodiment.

FIG. 8 is a cross-sectional view of a magnetic element 854, having apertures 872 for countersunk screws.

Figure 9:
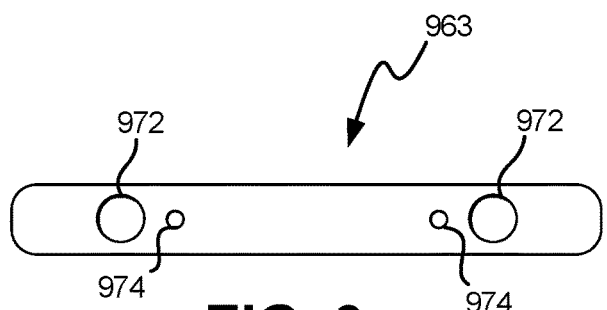
FIG. 9 is a top view of a plate according to an embodiment.

FIG. 9 is a cross-sectional view of a steel plate 963 that can be affixed to a replaceable tip (e.g., steel plate 663 that can be affixed to replaceable tip 604). FIG. 9 depicts apertures 972 configured to receive threaded studs and apertures 974 that can receive countersunk screws to hold the steel plate to the replaceable tip.

Figure 10:
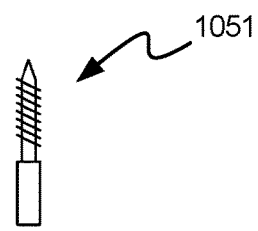
FIG. 10 is a plan view of a threaded stud according to an embodiment.

FIG. 10 is a top view of a threaded stud 1051 according to an embodiment. In alternative embodiments, rather than a threaded stud a mortise, a dowel, or some other structure could be used. Where the structure used is not circular in cross-section (e.g., a mortise) rotation can be prevented as described above.

Figure 11:
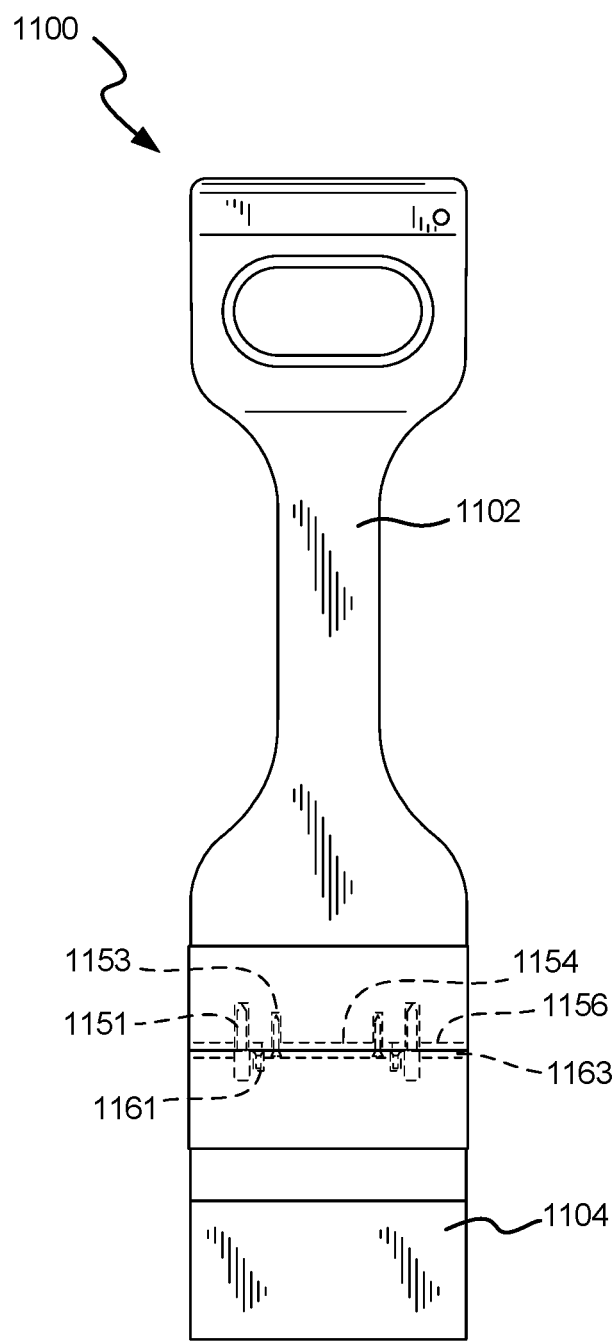
FIG. 11 is a top view of a grilling utensil according to an embodiment.

FIG. 11 is a top view of grilling device 1100 that is shown as transparent for clarity, to depict how components of the device 1100 are coupled. Grilling device 1100 includes permanent body 1102 and replaceable tip 1104. As shown in FIG. 11, replaceable tip 1104 is coupled to steel plate 1163 by countersunk screws 1161. Likewise, steel plate 1156 and magnet 1154 are coupled to permanent body 1102 by countersunk screws 1153. Threaded studs 1151 are screwed into permanent body 1102 and extend into replaceable tip 1104 for added mechanical support.

Figure 12:
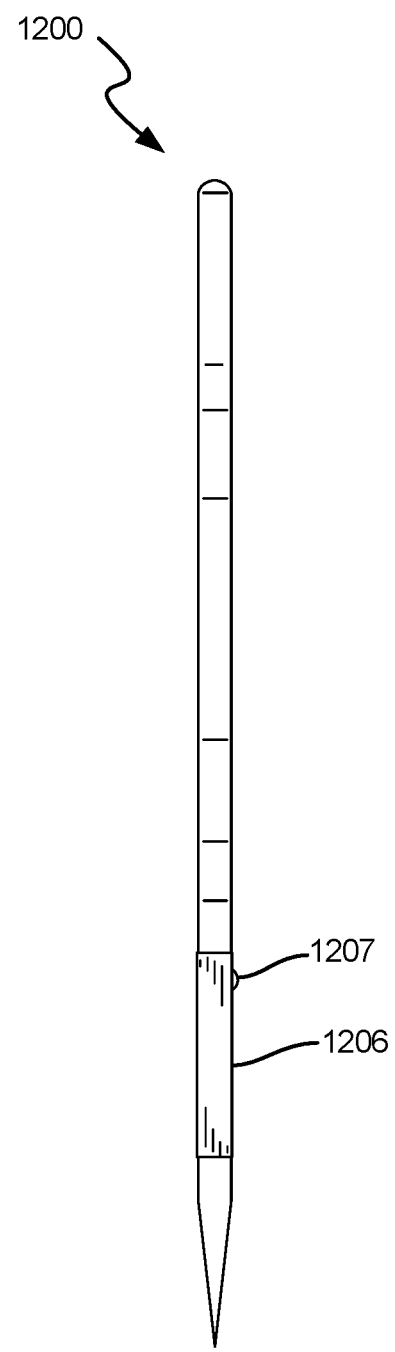
FIG. 12 is a side view of a grilling utensil according to an embodiment.

FIG. 12 is a side view of grilling device 1200 with the addition of ferrule 1206. As shown in FIG. 12, ferrule 1206 is attached to permanent body 1202 via fastening screw 1207.

FIG. 13A is a bottom view of ferrule 1306 including pilot holes 1307 through which screws can be affixed to fasten ferrule 1306 to another component (e.g., the permanent body as shown in FIG. 12). FIG. 13B is a bottom view of an alternate embodiment of ferrule 1306' in which there are a first row of pilot holes 1307A and a second row of pilot holes 1307B.

FIG. 14 is a top view of a ferrule 1406, which appears as a flat surface. In alternative embodiments, ferrule could be shaped differently to include features such as a grip.

FIG. 15 is a front view of a ferrule 1506. Ferrule 1506 is thin and substantially rectangular with rounded corners, in the embodiment shown in FIG. 15. In alternative embodiments, ferrule 1506 could have any other shape configured to mate with the corresponding outer surfaces of a removable tip and permanent body portion.

Figure 16:
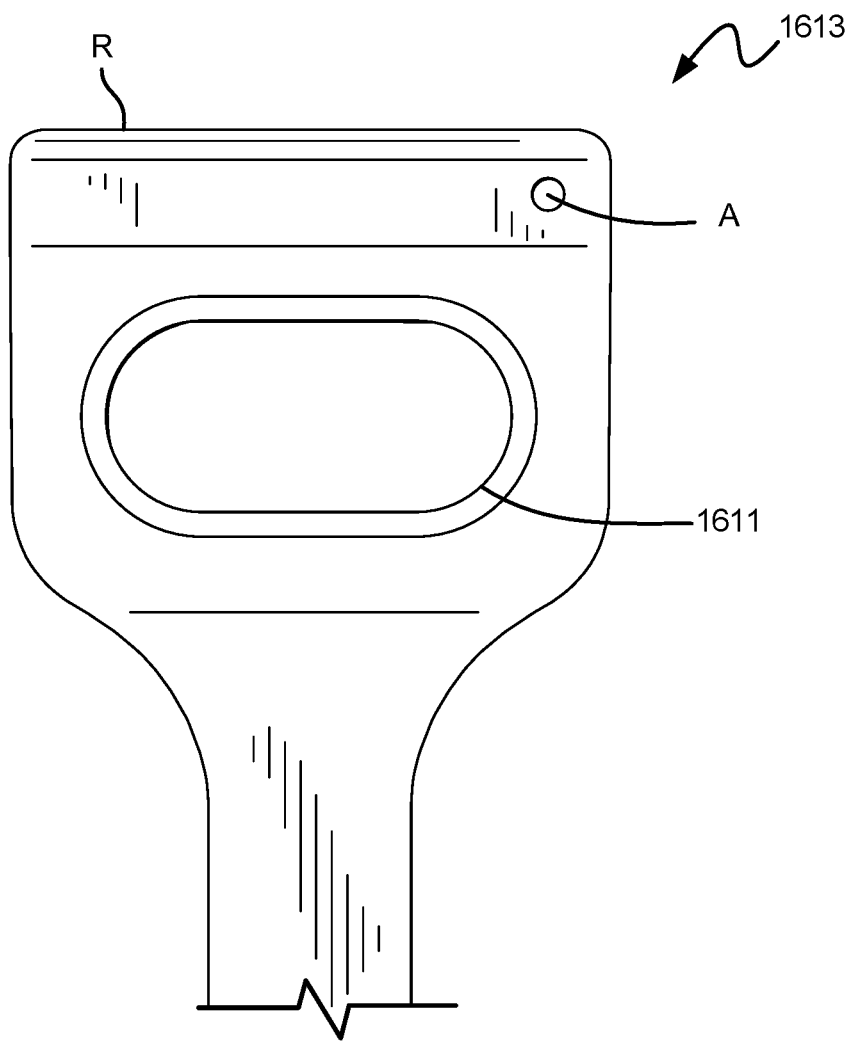
FIG. 16 is a partial view of a grilling utensil according to an embodiment, showing the handle portion in detail.
Figure 17:
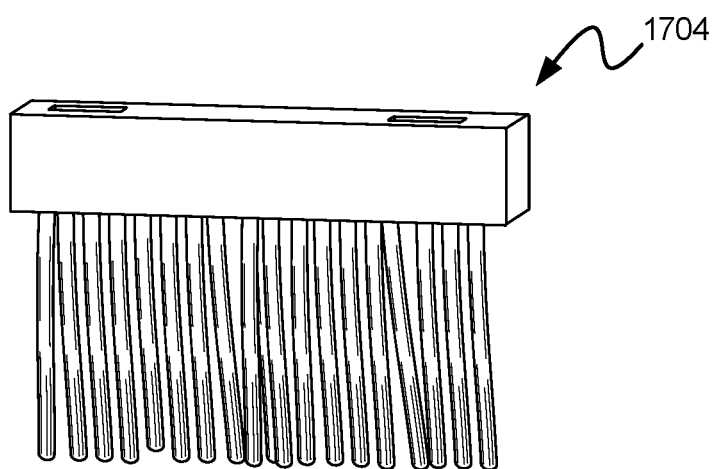
FIG. 17 is a basting mop according to an embodiment.
Figure 18:
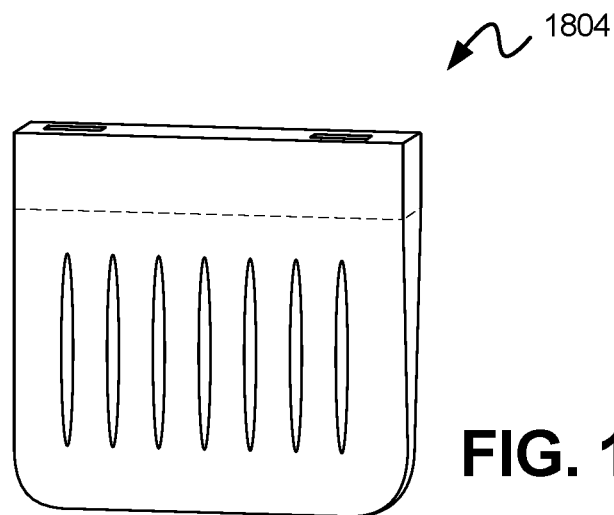
FIG. 18 is a spatula according to an embodiment.
Figure 19:
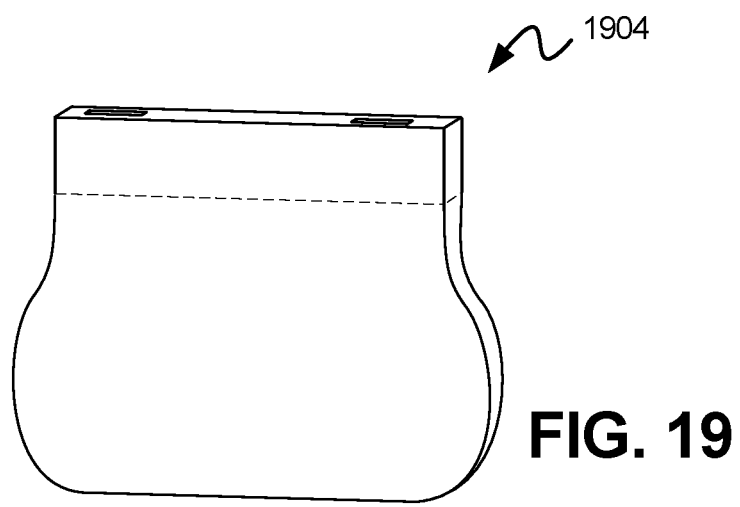
FIG. 19 is a pizza peel according to an embodiment.
Figure 20:
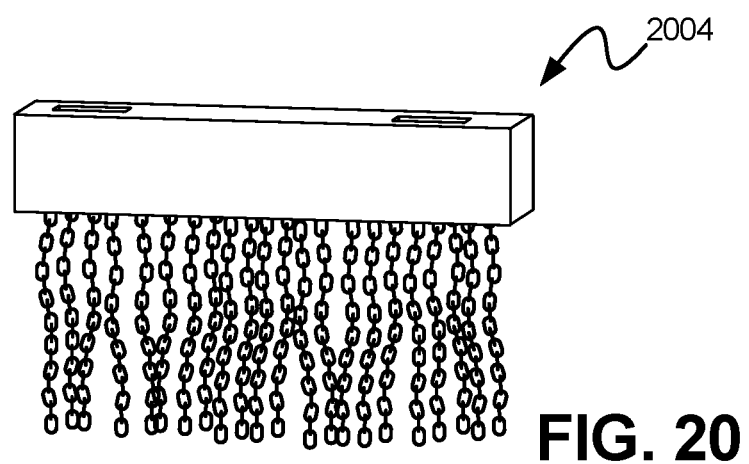
FIG. 20 is a chain link brush according to an embodiment.

FIG. 16 is a partial top view of a handle 1613. Handle 1613 defines handhold 1611, as well as aperture A for receiving a strap, hook, or other fastener or attachment.

FIGS. 17-20 show various attachments that can be used with a permanent body as described above with respect to other embodiments. Basting mop 1704 can be attached to the permanent body of any of the previously-described embodiments using a magnetic and mechanical attachment mechanism. Likewise, spatula 1804 can be attached to the permanent body of any of the previously-described embodiments using a magnetic and mechanical attachment mechanism. Likewise, pizza peel 1904 can be attached to the permanent body of any of the previously-described embodiments using a magnetic and mechanical attachment mechanism. Likewise, chain-link brush 2004 can be attached to the permanent body of any of the previously-described embodiments using a magnetic and mechanical attachment mechanism. Various other attachments could be added to the permanent body using this attachment mechanism, such that the permanent body acts as a handle for those tools in addition to being usable as a part of a grill scraping system.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A grilling utensil comprising:
   A permanent body having a plurality of protrusions and having a magnetic element;
   a replaceable tip having a proximate end and a distal end, the proximate end being opposite the distal end and further comprising a plurality of pilot holes;
   wherein the plurality of protrusions are configured to engage with the plurality of pilot holes to mechanically couple the replaceable tip to the permanent body, the permanent body and the replaceable tip are made of a heat responsive material;
   wherein the heat responsive material is a wood;
   further comprising a magnetically susceptible element, wherein the magnetic element is arranged in an engagement portion and configured to attract the magnetically susceptible element to engage the proximate end to the permanent body and
   wherein the magnetically susceptible element is a steel plate that is affixed to the replaceable tip and defining a first set of apertures that aligns with the plurality of pilot holes to receive the plurality of protrusions, and wherein a second set of apertures are defined within the magnetically susceptible element and configured to receive one or more screws to couple the steel plate to the replaceable tip.

2. The grilling utensil of claim 1, wherein the distal end of the replaceable tip is defined by a beveled scraping edge.

3. The grilling utensil of claim 1, wherein the wood of the replaceable tip is selected based upon a desired grilling temperature or a desired seasoning to be applied to the grill surface.

4. The grilling utensil of claim 1, the grilling utensil further comprising:
   a ferrule having an upper portion and a lower portion, the upper portion at least partially surrounding the permanent body and the lower portion defining an insertion sleeve that at least partially surrounds the replaceable tip when the replaceable tip is engaged with the permanent body.

5. The grilling utensil of claim 1, wherein the plurality of protrusions comprises threaded studs arranged complementary to the pilot holes of the replaceable tip.

* * * * *